(12) United States Patent
Ben-Yehuda et al.

(10) Patent No.: US 8,151,265 B2
(45) Date of Patent: Apr. 3, 2012

(54) APPARATUS FOR AND METHOD FOR REAL-TIME OPTIMIZATION OF VIRTUAL MACHINE INPUT/OUTPUT PERFORMANCE

(75) Inventors: Shmuel Ben-Yehuda, Haifa (IL); John Michael Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 11/959,473

(22) Filed: Dec. 19, 2007

(65) Prior Publication Data
US 2009/0164990 A1 Jun. 25, 2009

(51) Int. Cl.
*G06F 9/46* (2006.01)
*G06F 9/455* (2006.01)
*G06F 3/00* (2006.01)
*G06F 13/00* (2006.01)

(52) U.S. Cl. ............... 718/1; 718/104; 710/10; 710/14; 710/16; 710/17; 719/327

(58) Field of Classification Search .................. None
See application file for complete search history.

(56) References Cited

U.S. PATENT DOCUMENTS

| 4,887,202 | A * | 12/1989 | Tanaka et al. ............... 703/21 |
| 6,944,699 | B1 * | 9/2005 | Bugnion et al. ............. 710/269 |
| 7,877,747 | B2 * | 1/2011 | Magenheimer ................ 718/1 |
| 7,945,436 | B2 * | 5/2011 | Ang et al. ..................... 703/23 |
| 2005/0076155 | A1 * | 4/2005 | Lowell ............................. 710/1 |
| 2005/0091365 | A1 * | 4/2005 | Lowell et al. ................. 709/224 |
| 2008/0276258 | A1 * | 11/2008 | Liu et al. ....................... 719/327 |

OTHER PUBLICATIONS

P. Willmann et al., "Concurrent Direct Network Access for Virtual Machine Monitors", HPCA 2007: IEEE 13th International Symposium on High Performance Computer Architecture, 2007.
M. Ben-Yehuda et al., "Utilizing IOMMUs for Virtualization in Linux and Xen", OLS 2007: Proceedings of the 2007 Ottawa Linux Symposium.
A. Warfield et al., "Facilitating the Development of Soft Devices", Proceedings of the 2005 USENIX, Annual Technical Conference, General Track.
P. Barham et al., "Xen and the art of virtualization", SOSP'03: Proceedings of the nineteenth ACM symposium on Operating systems principles.
J. Sugerman et al., "Virtualizing I/O Devices on VMware Workstation's Hosted Virtual Machine Monitor", Proceedings of the 2001 USENIX Annual Technical Conference.

* cited by examiner

*Primary Examiner* — Jennifer To
*Assistant Examiner* — Abdullah Al Kawsar
(74) *Attorney, Agent, or Firm* — Howie Zaretsky (57) ABSTRACT

The present invention implements a mechanism to decide when it is beneficial to switch from the current virtual input/output mechanism to a different one. The present invention determines which input/output mechanism each virtual machine should use based on the available input/output resources of the virtual machines (with their respective available input/output adapters), the number of virtual machines running and their input/output needs, and the input/output needs of the virtual machine being considered. The present invention also provides a mechanism for virtual machine to seamlessly switch input/output mechanisms. When beneficial, the standard hot-plug mechanism of the virtual machine and the hypervisor is used to first remove the existing input/output mechanism and then add the new input/output mechanism.

15 Claims, 6 Drawing Sheets

APPARATUS FOR AND METHOD FOR REAL-TIME OPTIMIZATION OF VIRTUAL MACHINE INPUT/OUTPUT PERFORMANCE

FIELD OF THE INVENTION

The present invention relates to the field of virtual machine input/output mechanisms, and more particularly relates to a method for deciding at run time which input/output mechanism a virtual machine should be using at any point in time, as well as a method for seamlessly switching between the different input/output mechanisms to the one most appropriate at that point in time.

BACKGROUND OF THE INVENTION

Virtualization technology makes it possible to run multiple virtual machines on a single physical machine. Multiple virtual machines running on the same hardware require the ability to share input/output (I/O) devices such as disk drives and network adapters. Two traditional approaches to implementing virtual machine I/O are emulation and paravirtualization. Emulation is accomplished by implementing an I/O device as software. This software implementation (i.e. the emulated I/O device) is controlled by a hypervisor (i.e. a virtualization platform), and a virtual machine accesses the emulated I/O device as though it was a real hardware device. While emulation is the simplest method for implementing an I/O device on a hypervisor, it is the least efficient (i.e. slowest) access method due the additional software layer required to access the physical device.

Figure 1:
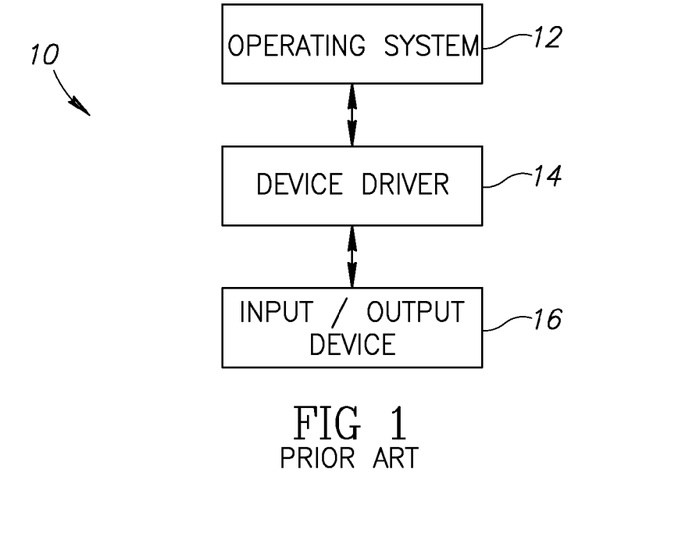
FIG. 1 is a block diagram of controlling an input/output (I/O) device without virtualization illustrating the prior art.

A block diagram illustrating the prior art method of controlling an I/O device without virtualization is shown in FIG. 1. The block diagram, generally referenced 10, comprises operating system 12, device driver 14 and physical I/O device 16. Operating system 12 communicates with physical I/O device 16 via device driver 14.

Figure 2A:
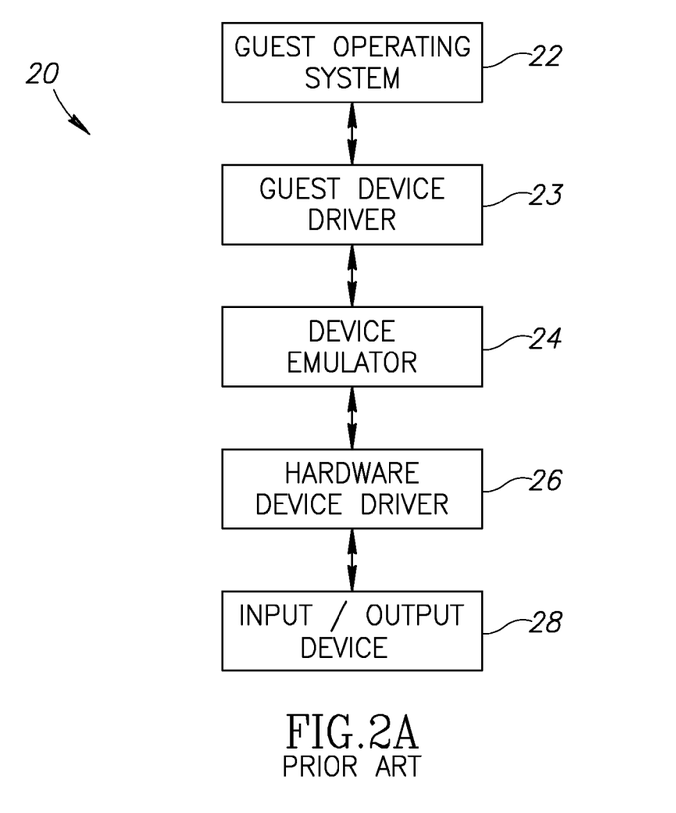
FIG. 2A is a block diagram of a virtual machine controlling an I/O mechanism via emulation illustrating the prior art.

A block diagram illustrating the prior art method of controlling an I/O device via emulation is shown in FIG. 2A. The block diagram, generally referenced 20, comprises s guest operating system 22, guest device driver 23, device emulator 24, hardware device driver 26 and physical I/O device 28. Guest operating system 22 (a virtual machine) performs I/O by communicating with device emulator 26 (a component of the hypervisor) via guest device driver 23. Device emulator 24 communicates with I/O device 28 via hardware device driver 26. As shown in FIGS. 1 and 2A, performing I/O by emulation requires additional software layers which results in less efficiency. The advantage of emulation is that the virtual machine (i.e. the guest operating system) is not aware that it is running on a virtualization platform (e.g., a fully virtualized Windows running on either VMware or Xen).

Paravirtualization is a more efficient (i.e. than emulation) method of virtual machine I/O employing paravirtualized drivers which are virtual I/O drivers. This in effect creates a virtual I/O device, where the virtual machine is aware of the fact that it is running on a hypervisor. The virtual machine communicates with the hypervisor in order to access the paravirtualized device. Paravirtualization is implemented when the virtual machine is designed to run on a hypervisor (e.g., a paravirtualized Linux on either POWER Hypervisor or Xen).

Figure 2B:
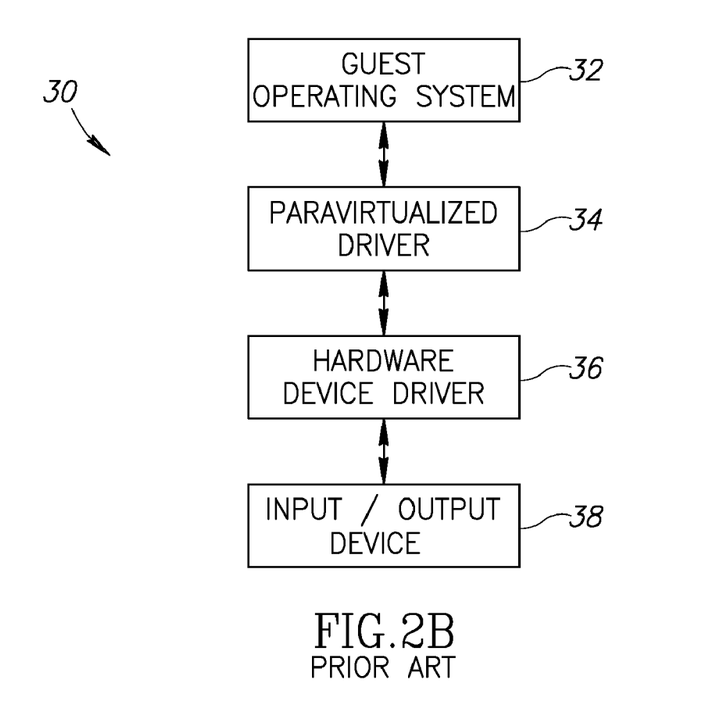
FIG. 2B is a block diagram of a virtual machine controlling an I/O mechanism via paravirtualization illustrating the prior art.

A block diagram illustrating the prior art method of controlling an I/O device via paravirtualization is shown in FIG. 2B. The block diagram, generally referenced 30, comprises guest operating system 32, paravirtualized driver 34, hardware device driver 36 and physical I/O device 38. Guest operating system (a virtual machine) 32 communicates with I/O device 38 by communicating with paravirtualized driver 34. Paravirtualized driver 34 then issues calls to hardware device driver 36 controlling I/O device 38. Paravirtualization is much more efficient than emulation since it does not have the overhead of the additional emulation software layer. Paravirtualization provides an indirect conduit for a virtual machine to communicate with a physical I/O device.

A third approach to virtual machine I/O is to grant a virtual machine direct access to a peripheral hardware device. Due to limitations of modern computer architectures, this approach has been rarely used because without special hardware support since it violates basic isolation guarantees. Virtual machines with direct access to a hardware device could overtake the machine by programming the device to perform a direct memory access (DMA) anywhere in memory, including over the hypervisor. This issue is specifically addressed by the introduction of input/output memory management units (IOMMUs). IOMMUs are hardware devices that translate device DMA addresses to machine addresses. An isolation capable IOMMU restricts a physical I/O device so that it can only access to the specific sections of memory allocated to the physical I/O device. Hypervisors utilize IOMMUs to grant secure direct hardware access to virtual machines.

Figure 2C:
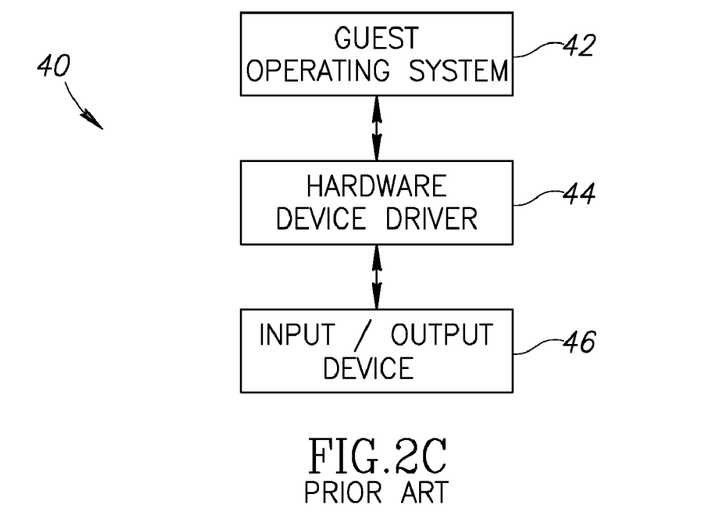
FIG. 2C is a block diagram of a virtual machine controlling an I/O mechanism via direct access illustrating the prior art.

A block diagram illustrating the prior art method of controlling an I/O device via direct access (also called "pass through") is shown in FIG. 2C. The block diagram, generally referenced 40 comprises guest operating system 42, hardware device driver 44 and physical I/O device 46. Guest operating system 42 (a virtual machine) communicates with I/O device 46 directly via hardware device driver 44.

Direct access significantly improves I/O performance. However, IOMMUs can impose a performance penalty due to the extra memory accesses required to perform DMA operations. Additionally, using direct hardware access with legacy (non-self-virtualizing) adapters has certain limitations such as disabling live migration and requiring the exclusive dedication of a physical I/O device to a single virtual machine.

IO mechanisms (i.e. emulation, paravirtualization and direct access) are currently assigned to a virtual machine upon startup of the virtual machine. If an I/O mechanism needs to be changed, the virtual machine associated with the I/O mechanism needs to be (1) shut down, (2) reconfigured for the new I/O mechanism and (3) restarted with the new I/O mechanism. In addition, as the workload the machine runs changes, the initial assignment of I/O mechanisms will become sub-optimal. Therefore there is a need for a mechanism that is able to assign the appropriate I/O mechanism to each virtual machine so that overall system performance is optimized. The mechanism should be fully autonomous, guest operating system independent and should be able to control a wide variety of I/O devices. In addition, the mechanism should account for the addition and removal of virtual machines running on the hypervisor, and should be able to change the I/O device configurations of the virtual machines as their respective needs change.

SUMMARY OF THE INVENTION

The present invention provides a solution to the prior art problems discussed supra by providing a mechanism to decide when it is beneficial to switch from the current virtual input/output (I/O) mechanism to a different one. The mechanism can reside in the hypervisor, virtual machine, both or elsewhere. Deciding when it is beneficial to switch I/O mechanisms is based on the current and anticipated I/O requirements of the hypervisor and the virtual machines running on the hypervisor, including parameters such as the virtual machine's workload, I/O resources available, I/O resources used by each virtual machine, and the hypervisor. The present invention determines which I/O mechanism each virtual machine should use based on the available I/O resources of the machines (i.e. with their respective available I/O adapters), the number of virtual machines running and their I/O needs, and the I/O needs of the virtual machine being considered.

The present invention also provides a mechanism for a virtual machine to seamlessly switch I/O mechanisms. When it is beneficial, the standard hot-plug mechanisms of the virtual machine and the hypervisor are used to first remove the existing I/O mechanism (i.e. hot-remove the virtual I/O driver) and then add the new I/O mechanism (e.g., hot-plug the driver for the physical peripheral device, when switching to direct hardware access).

In one example application, the invention is used to facilitate the development of analytic tools to monitor and optimize the I/O performance of a hypervisor running one or more virtual machines. Automated analysis results in the most effective real-time distribution of available I/O mechanisms. System downtime is also reduced since the present invention provides a method to re-allocate I/O resources in the event of the failure of an I/O resource.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a first method of real-time switching from a first input/output (I/O) mechanism to a second I/O mechanism of a virtual machine operating on a virtualization platform, said virtualization platform operating on a computer, comprising the steps of uncoupling said first I/O mechanism from said virtual machine and coupling said second I/O mechanism to said virtual machine.

The virtual machine referenced in the first method described hereinabove comprises a mechanism for hiding the physical characteristics of computing resources from the means said computer resources are accessed.

The I/O mechanism referenced in the first method described hereinabove comprises emulation.

The I/O mechanism referenced in the first method described hereinabove comprises paravirtualization.

The I/O mechanism referenced in the first method described hereinabove comprises direct access.

There is also provided a first computer program product comprising a computer usable medium having computer usable program code for real-time switching from a first input/output (I/O) mechanism to a second I/O mechanism of a virtual machine operating on a virtualization platform, said virtualization platform operating on a computer, including computer usable program code for uncoupling said first I/O mechanism from said virtual machine and computer usable program code for coupling said second I/O mechanism to said virtual machine.

The virtual machine referenced in the first computer program described hereinabove comprises a mechanism for hiding the physical characteristics of computing resources from the means said computer resources are accessed.

The I/O mechanism referenced in the first computer program product described hereinabove comprises emulation.

The I/O mechanism referenced in the first computer program product described hereinabove comprises paravirtualization.

The I/O mechanism referenced in the first computer program product described hereinabove comprises direct access.

There is further provided a second method of allocating input/output (I/O) mechanisms to one or more virtual machines operating on one or more virtualization platforms, said one or more virtualization platforms operating on a computer, comprising the steps of discovering available physical I/O devices available to said one or more virtual machines, evaluating the I/O requirements of each said virtual machine and determining an optimal I/O mechanism for each said virtual machine by evaluating the current and anticipated I/O requirements of said one or more virtualization platforms and said one or more virtual machines operating on said one or more virtualization platforms.

The virtual machine referenced in the second method described hereinabove comprises a mechanism for hiding the physical characteristics of computing resources from the means said computer resources are accessed.

The I/O mechanism referenced in the second method described hereinabove comprises emulation.

The I/O mechanism referenced in the second method described hereinabove comprises paravirtualization.

The I/O mechanism referenced in the second method described hereinabove comprises direct access.

There is further provided a third method of real-time input/output (I/O) performance optimization of one or more virtual machines operating on one or more virtualization platforms, said one or more virtualization platforms operating on one or more computers, comprising the steps of discovering available physical I/O devices available to said one or more virtual machines, evaluating the I/O requirements of each said virtual machines, determining an optimal I/O mechanism for each said virtual machine by evaluating the current and anticipated I/O requirements of said one or more virtualization platforms and said one or more virtual machines running on said on or more virtualization platforms, uncoupling the I/O mechanism previously coupled to each said virtual machine and coupling said optimal I/O mechanism to each said virtual machine.

The virtual machine referenced in the third method described hereinabove comprises a mechanism for hiding the physical characteristics of computing resources from the means said computer resources are accessed.

The I/O mechanism referenced in the third method described hereinabove comprises emulation.

The I/O mechanism referenced in the third method described hereinabove comprises paravirtualization.

The I/O mechanism referenced in the third method described hereinabove comprises direct access.

There is also provided a second computer program product comprising a computer usable medium having computer usable program code for real-time input/output (I/O) performance optimization of one or more virtual machines operating on one or more virtualization platforms, said one or more virtualization platforms operating on one or more computers, including computer usable program code for discovering available physical I/O devices available to said one or more virtual machines, computer usable program code for evaluating the I/O requirements of each said virtual machine, computer usable program code for determining an optimal I/O mechanism for each said virtual machine by evaluating the current and anticipated I/O requirements of said one or more virtualization platforms and said one or more virtual machines running on said on or more virtualization platforms, computer usable program code for uncoupling the I/O mechanism previously coupled to each said virtual machine and computer usable program code for coupling said optimal I/O mechanism to each said virtual machine.

The virtual machine referenced in the second computer program product described hereinabove comprises a mechanism for hiding the physical characteristics of computing resources from the means said computer resources are accessed.

The I/O mechanism referenced in the second computer program product described hereinabove comprises emulation.

The I/O mechanism referenced in the second computer program product described hereinabove comprises paravirtualization.

The I/O mechanism referenced in the second computer program product described hereinabove comprises direct access.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| CD-ROM | Compact Disc Read Only Memory |
| CPU | Central Processing Unit |
| DMA | Direct Memory Access |
| DSP | Digital Signal Processor |
| EEROM | Electrically Erasable Read Only Memory |
| FPGA | Field Programmable Gate Array |
| FTP | File Transfer Protocol |
| HDL | Hardware Description Language |

-continued

| Term | Definition |
| --- | --- |
| HTTP | Hyper-Text Transport Protocol |
| I/O | Input/Output |
| IOMMU | Input/Output Memory Management Unit |
| LAN | Local Area Network |
| NIC | Network Interface Card |
| RAM | Random Access Memory |
| ROM | Read Only Memory |
| WAN | Wide Area Network |

DETAILED DESCRIPTION OF THE INVENTION

The present invention provides a solution to the prior art problems discussed supra by providing a mechanism to decide when it is beneficial to switch from the current virtual input/output (I/O) mechanism to a different one. The mechanism can reside in the hypervisor, virtual machine, both or elsewhere. Deciding when it is beneficial to switch I/O mechanisms is based on the current and anticipated I/O requirements of the hypervisor and the virtual machines running on the hypervisor, including parameters such as the virtual machine's workload, I/O resources available, I/O resources used by each virtual machine, and the hypervisor. The present invention determines which I/O mechanism each virtual machine should use based on the available I/O resources of the machines (i.e. with their respective available I/O adapters), the number of virtual machines running and their I/O needs, and the I/O needs of the virtual machine being considered.

The present invention also provides a mechanism for a virtual machine to seamlessly switch I/O mechanisms. When it is beneficial, the standard hot-plug mechanisms of the virtual machine and the hypervisor are used to first remove the existing I/O mechanism (i.e. hot-remove the virtual I/O driver) and then add the new I/O mechanism (e.g., hot-plug the driver for the physical peripheral device, when switching to direct hardware access).

In one example application, the invention is used to facilitate the development of analytic tools to monitor and optimize the I/O performance of a hypervisor running one or more virtual machines. Automated analysis results in the most effective real-time distribution of available I/O mechanisms. System downtime is also reduced since the present invention provides a method to re-allocate I/O resources in the event of the failure of an I/O resource.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 3:
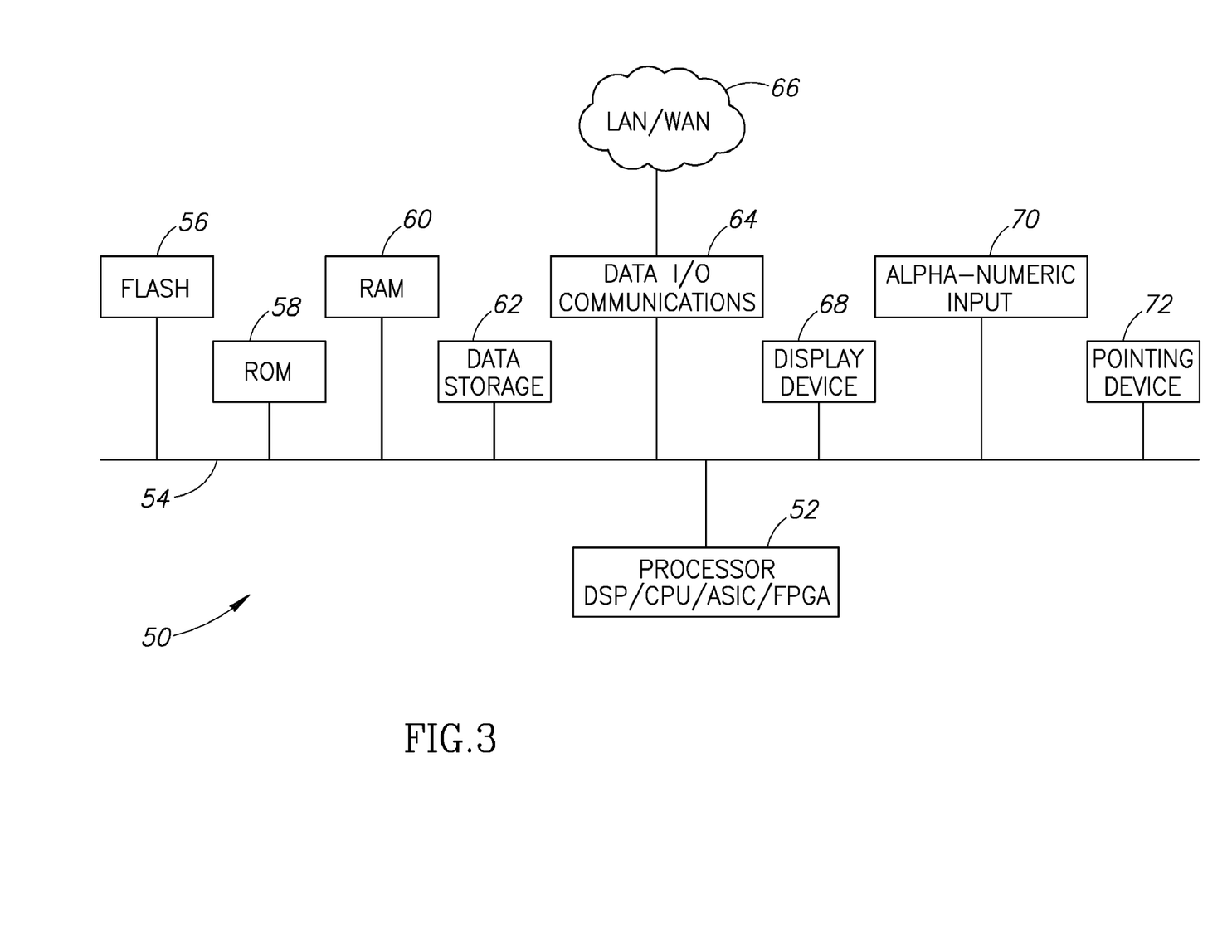
FIG. 3 is a block diagram illustrating an example computer processing system adapted to implement the run-time switching of I/O mechanism of the present invention.

A block diagram illustrating an example computer processing system adapted to implement the real-time optimization of virtual machine input/output performance mechanism of the present invention is shown in FIG. 3. The computer system, generally referenced 50, comprises a processor 52 which may comprise a digital signal processor (DSP), central processing unit (CPU), microcontroller, microprocessor, microcomputer, ASIC or FPGA core. The system also comprises static read only memory 58 and dynamic main memory 60 all in communication with the processor. The processor is also in communication, via bus 54, with a number of peripheral devices that are also included in the computer system. Peripheral devices coupled to the bus include a display device 68 (e.g., monitor), alpha-numeric input device 70 (e.g., keyboard) and pointing device 72 (e.g., mouse, tablet, etc.)

The computer system is connected to one or more external networks such as a LAN or WAN 66 via communication lines connected to the system via data I/O communications interface 64 (e.g., network interface card or NIC). The network adapters 64 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 62 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the real-time optimization of virtual machine input/output performance mechanism of the present invention is adapted to reside on a computer readable medium, such as a magnetic disk within a disk drive unit. Alternatively, the computer readable medium may comprise a floppy disk, removable hard disk, Flash memory 56, EEROM based memory, bubble memory storage, ROM storage, distribution media, intermediate storage media, execution memory of a computer, and any other medium or device capable of storing for later reading by a computer a computer program implementing the method of this invention. The software adapted to implement the quality estimation mechanism of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the quality estimation mechanism of the present invention, and to the extent that a particular system configuration is capable of implementing the system and methods of this invention, it is equivalent to the representative digital computer system of FIG. 3 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

Optimizing Input/Output Performance of Virtual Machines

In accordance with the invention, a management entity monitors the current allocation of Input/Output (I/O) mechanisms to virtual machines running on a hypervisor and decides when it is beneficial to switch from the current virtual I/O mechanism to a different one. This decision can be based on (1) the workload of each virtual machine, (2) I/O resources available, (3) the current mix of I/O mechanisms used by all virtual machines and the hypervisor, (4) the number of virtual machines per physical host and (5) the number and capabilities of the virtual I/O adapters. All the factors are appropriately ranked and an optimal mix of I/O mechanisms is implemented.

Figure 4:
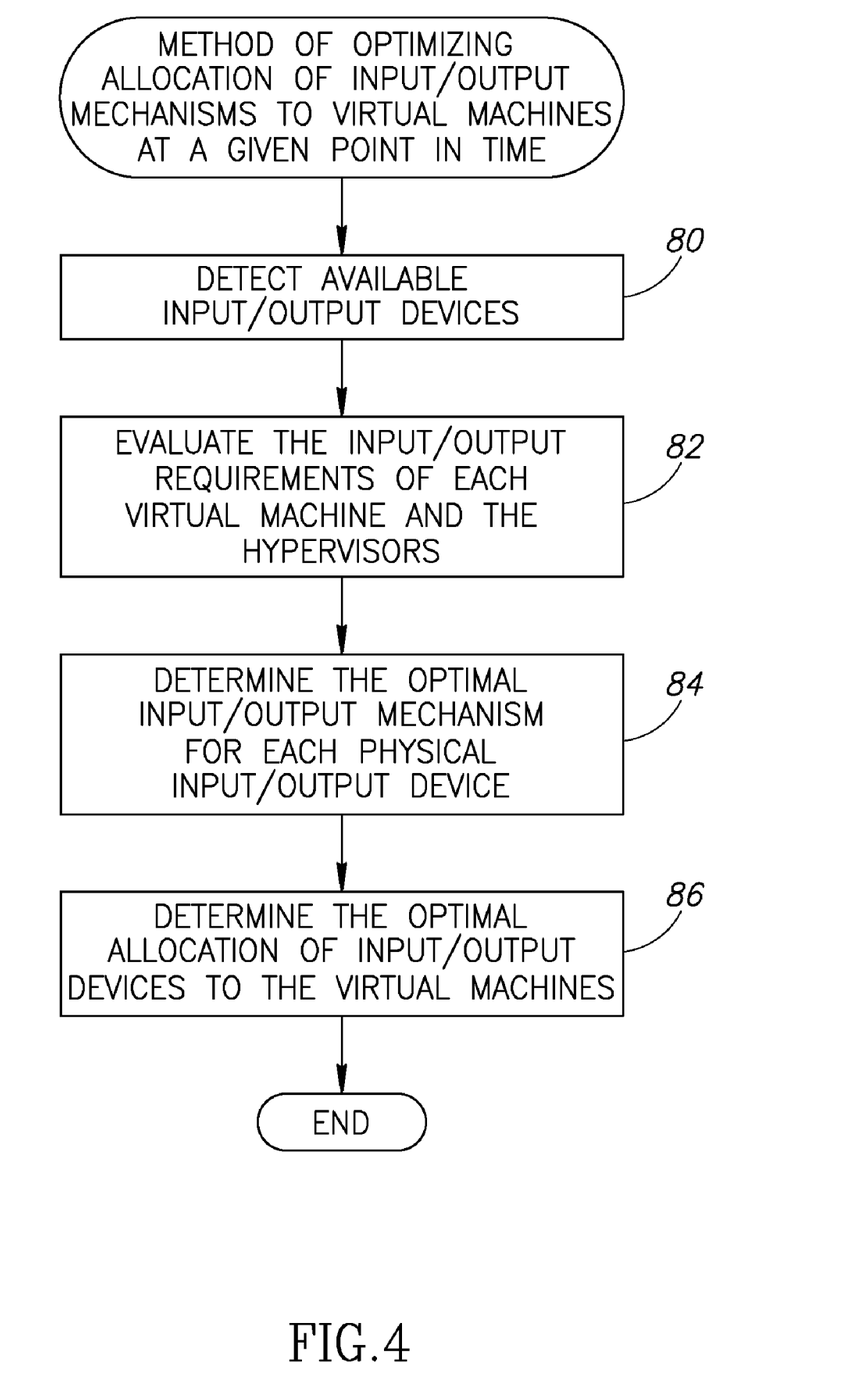
FIG. 4 is a flow diagram illustrating the I/O mechanism allocation method used in the present invention.

A flow diagram illustrating the method of allocating an optimal mix of I/O mechanism is shown in FIG. 4. The management entity first detects what I/O devices are currently available (step 80). The management entity then evaluates the anticipated needs of each virtual machine presently running as well as the hypervisors (step 82). Finally, the management entity determines the optimal I/O mechanism for each physical I/O device (step 84) and the optimal allocation of I/O mechanisms to each virtual machine (step 86).

In accordance with the invention, once the optimal allocation of both I/O devices to I/O mechanisms and I/O mechanism to virtual machines has been established, the I/O mechanisms are coupled to the appropriate I/O devices and the I/O mechanisms are hot plugged to the appropriate virtual machine. Hot plugging, also called hot-swapping, is the ability to remove and replace components of a computer, while it is operating (i.e., not requiring a reboot). While hot plugging usually refers to a physical device, the present invention uses this technique for either a physical device (i.e. direct access) or a virtual device (i.e. through either emulation or paravirtualization)

Figure 5:
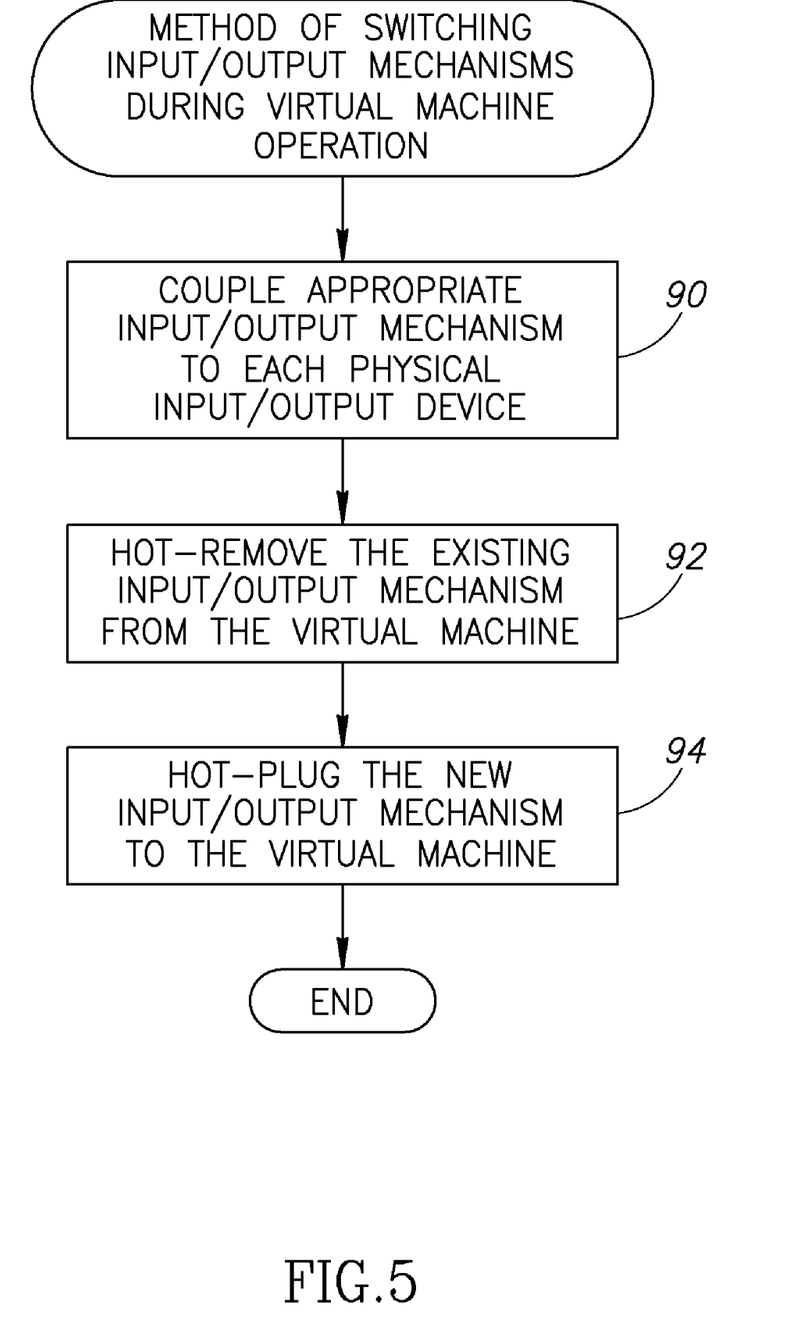
FIG. 5 is a flow diagram illustrating the I/O mechanism switching method of the present invention.

A flow diagram illustrating the method of switching a virtual machine I/O mechanism to a physical I/O device in during virtual machine operation is shown in FIG. 5. First the appropriate I/O mechanism is coupled to the physical I/O device (step 90). The existing I/O mechanism is then hot-removed from the virtual machine (step 92). Finally, the new I/O mechanism is hot-plugged to the virtual machine (step 94).

Figure 6A:
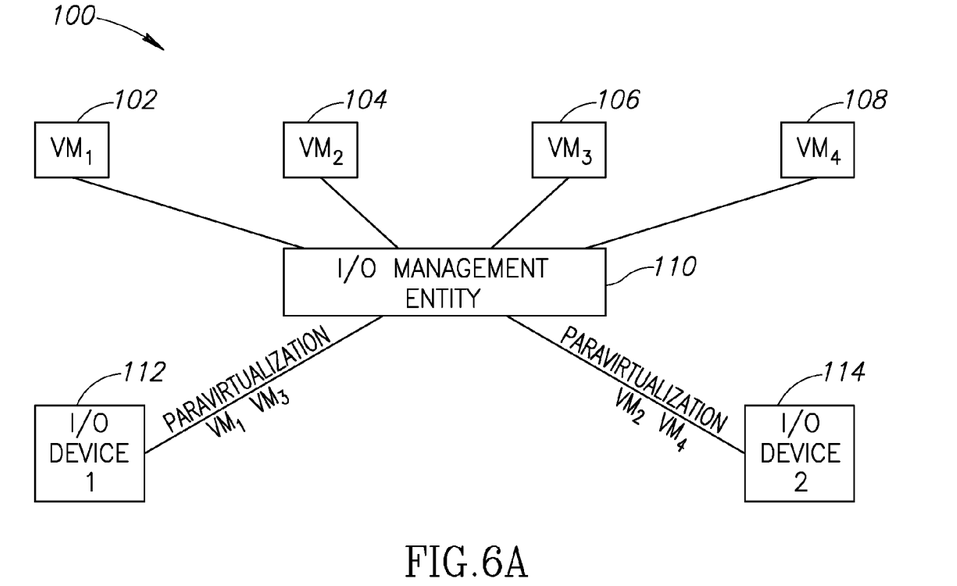
FIG. 6A is block diagram illustrating a first example of the allocation of I/O mechanisms among virtual machines.
Figure 6B:
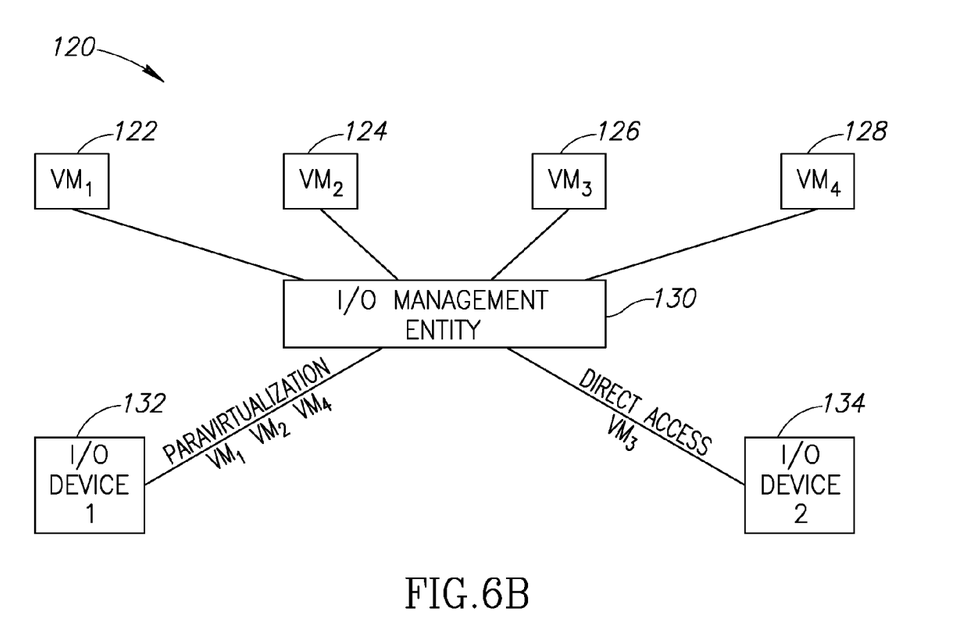
FIG. 6B is block diagram illustrating a second example of the allocation of I/O mechanisms among virtual machines.

A block diagram illustrating am example of the present invention in operation is shown in FIGS. 6A and 6B. FIG. 6A, generally referenced 100, comprises virtual machines 102, 104, 106, 108, I/O management entity 110 and physical I/O devices 112 and 114. In the displayed configuration virtual machines 102 and 106 are coupled to physical I/O device 112 via paravirtualization, and virtual machines 104 and 108 are coupled to physical I/O device 114 also via paravirtualization. FIG. 6B, generally referenced 120 illustrates a sample resulting configuration if I/O management entity 110 determines that the current allocation of I/O mechanisms is not optimal due to the increased I/O requirements of virtual machine 106 (i.e. $VM_3$). FIG. 6B, generally referenced 120 comprises virtual machines 122, 124, 126, 128, I/O management entity 130, and physical I/O devices 132 and 134. In this configuration virtual machines 122, 124 and 130 are coupled to physical I/O device 132 via paravirtualization and virtual machine 126 (i.e. $VM_3$) is coupled to physical I/O device 134 via direct access.

An example of how the present invention would benefit a sample system configuration is if a business uses a server primarily for transaction processing during the day and batch processing at night. In addition, there are transaction and batch processing needs during the day as well. The system is configured with transaction processing being executed on one virtual machine and batch processing being executed on a second virtual machine. The physical I/O adapters on the server are allocated in order that there are some I/O adapters that are available to be dedicated to an individual virtual machine. There are also some general use I/O adapters for shared use among other virtual machines. During the day time (i.e. heavy transaction processing), the hypervisor gives the transaction processing virtual machine direct access to an I/O adapter. At night (i.e. heavy batch processing) the hypervisor would transfer the adapters reserved for direct access to the batch processing virtual machine. This enables the virtual machine with the heaviest I/O requirements (at any given time) to have direct I/O access while still providing I/O capabilities for the virtual machines with lighter I/O requirements. The hypervisor continually monitors I/O activity in order to determine when to reallocate the dedicated I/O adapters to a new virtual machine.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of real-time switching from a first input/output (I/O) mechanism to a second I/O mechanism of a virtual machine operating on a virtualization platform comprising one or more virtual machines associated with one or more hypervisors, said virtualization platform operating on a computer, said method comprising the steps of:

hot-removing said first I/O mechanism from said virtual machine in response to monitoring said first I/O mechanisms allocated to said one or more virtual machines, evaluation of the said first I/O mechanism and an anticipated I/O mechanism requirements of each of said one or more virtual machines and their associated hypervisors and subsequent determination, based on one or more factors comprising I/O resources available for each of said virtual machines and their associated one or more hypervisors running on said first I/O mechanism, of an optimal allocation of I/O mechanism to said one or more virtual machines; and hot-plugging said second I/O mechanism as the optimal I/O mechanism to said one or more virtual machines in accordance with said optimal allocation determination, wherein said I/O mechanism comprises emulation and direct access.

2. The method according to claim 1, wherein said virtual machine comprises a mechanism for hiding the physical characteristics of computing resources from the means said computer resources are accessed.

3. The method according to claim 1, wherein said I/O mechanism comprises paravirtualization.

4. A computer program stored in a non-transitory computer storage medium having computer usable program code for real-time switching from a first input/output (I/O) mechanism to a second I/O mechanism of a virtual machine operating on a virtualization platform comprising one or more virtual machines associated with one or more hypervisors, said virtualization platform operating on a computer, said computer program product when executed by a process to perform a method, including:

hot-removing said first I/O mechanism from said one or more virtual machines in response to an evaluation of the first I/O mechanism and an anticipated I/O mechanism requirements of each of said one or more virtual machines and their associated hypervisors and subsequent determination, based on one or more factors comprising a current mix of I/O mechanisms used by all virtual machines and the associated hypervisors, of an optimal allocation of I/O mechanism to said one or more virtual machines; and hot-plugging said second I/O mechanism as said optimal I/O mechanism to said one or more virtual machines in accordance with said optimal allocation determination, wherein said I/O mechanism comprises emulation and direct access.

5. The method according to claim 4, wherein said virtual machine comprises a mechanism for hiding the physical characteristics of computing resources from the means said computer resources are accessed.

6. The method according to claim 4, wherein said I/O mechanism comprises paravirtualization.

7. A method of allocating input/output (I/O) mechanisms to one or more virtual machines operating on one or more virtualization platforms, said one or more virtualization platforms operating on a computer, said method comprising the steps of:

discovering physical I/O devices available to said one or more virtual machines; evaluating an I/O mechanism requirements of each said one or more virtual machines and associated one or more hypervisors by monitoring I/O performance based on one or more factors of each said one or more virtual machines and their associated one or more hypervisors running on a current I/O mechanism;

determining, based on a plurality of factors, including the workload of each said one or more virtual machines and the I/O resources available, an optimal I/O mechanism for each said one or more virtual machines by evaluating the current I/O mechanism and anticipated I/O mechanism requirements of said one or more virtualization platforms and said one or more virtual machines operating on said one or more virtualization platforms;

hot-removing the current I/O mechanism previously coupled to each said one or more virtual machines; and hot-plugging the optimal I/O mechanisms to each said one or more virtual machines in accordance with said optimal allocation determination, wherein said I/O mechanism comprises emulation and direct access.

8. The method according to claim 7, wherein said virtual machine comprises a mechanism for hiding the physical characteristics of computing resources from the means said computer resources are accessed.

9. The method according to claim 7, wherein said I/O mechanism comprises paravirtualization.

10. A method of real-time input/output (I/O) performance optimization of one or more virtual machines operating on one or more virtualization platforms, said one or more virtualization platforms operating on one or more computers, said method comprising the steps of:

discovering physical I/O devices available to said one or more virtual machines;

evaluating an I/O mechanism requirements of each said one or more virtual machines and associated one or more hypervisors by monitoring I/O performance based on one or more factors of each said one or more virtual machines and their associated one or more hypervisors running on a current I/O mechanism;

determining, based on one or more factors comprising the number of virtual machines per physical host, an optimal I/O mechanism for each virtual machine by evaluating the current I/O mechanism and anticipated I/O mechanism requirements of said one or more virtualization platforms and said one or more virtual machines running on said one or more virtualization platforms;

hot-removing the current I/O mechanism previously coupled to each said virtual machine; and hot-plugging said optimal I/O mechanism to each said virtual machine in accordance with said optimal allocation determination, wherein said I/O mechanism comprises emulation and direct access.

11. The method according to claim 10, wherein or more virtual machine comprises a mechanism for hiding the physical characteristics of computing resources from the means said computer resources are accessed.

12. The method according to claim 10, wherein said I/O mechanism comprises paravirtualization.

13. A computer program stored in a non-transitory computer storage medium having computer usable program code for real-time input/output (I/O) performance optimization of one or more virtual machines operating on one or more virtualization platforms, said one or more virtualization platforms operating on one or more computers, said computer program product when executed by a process to perform a method, including:

discovering physical I/O devices available to said one or more virtual machines;

evaluating an I/O mechanism requirements of each said one or more virtual machines and their associated one or more hypervisors by monitoring I/O performance based on one or more factors of each said one or more virtual machines and their associated one or more hypervisors running on a current I/O mechanism;

determining, based on one or more factors comprising workload of each of said one or more virtual machines, an optimal I/O mechanism for each virtual machine by evaluating the current I/O mechanism and anticipated I/O mechanism requirements of said one or more virtualization platforms and said one or more virtual machines running on said one or more virtualization platforms;

hot-removing the current I/O mechanism previously coupled to each said virtual machine; and hot-plugging said optimal I/O mechanism to each said virtual machine in accordance with said optimal allocation determination, wherein said I/O mechanism comprises emulation and direct access.

14. The method according to claim 13, wherein said virtual machine comprises a mechanism for hiding the physical characteristics of computing resources from the means said computer resources are accessed.

15. The method according to claim 13, wherein said I/O mechanism comprises paravirtualization.

* * * * *